No. 896,614. PATENTED AUG. 18, 1908.
G. H. BENEDICT.
PROPORTIONAL DIVIDERS.
APPLICATION FILED FEB. 28, 1908.
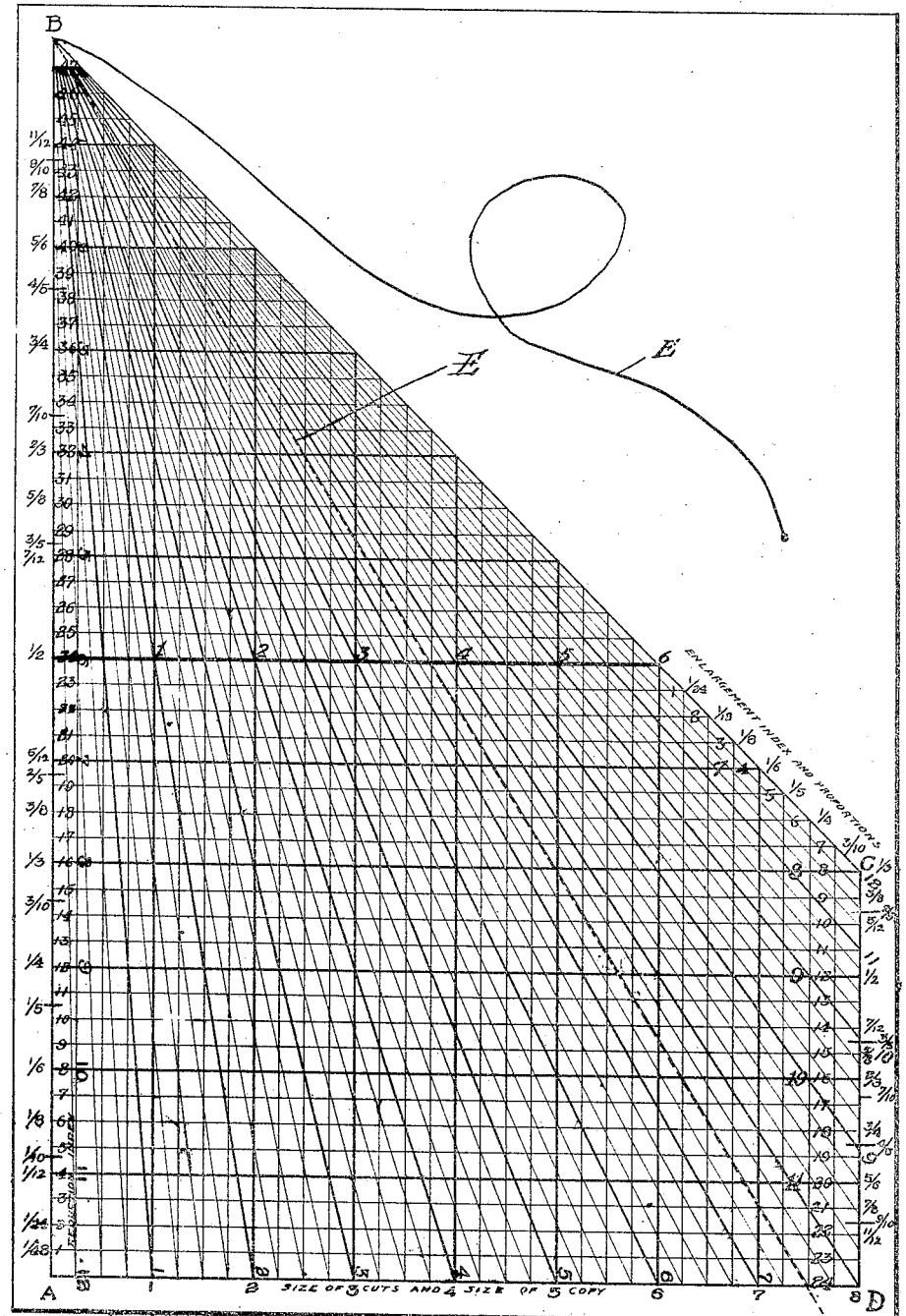

UNITED STATES PATENT OFFICE.

GEORGE H. BENEDICT, OF CHICAGO, ILLINOIS.

PROPORTIONAL DIVIDERS.

No. 896,614.  Specification of Letters Patent.  Patented Aug. 18, 1908.

Application filed February 28, 1908. Serial No. 418,312.

*To all whom it may concern:*

Be it known that I, GEORGE H. BENEDICT, a citizen of the United States, residing at Chicago, in the county of Cook and State of Illinois, have invented certain new and useful Improvements in Proportional Dividers, of which the following is a full, clear, and exact specification.

This invention relates more particularly to a proportional divider in the form of a chart for determining the proportion of reduction of any given size to another given size, or, where the proportion of reduction and the original size are previously ascertained or given, to determining what the reduced size will be when the original is reduced in that proportion, and the invention has for its primary object to provide a proportional divider or chart by which any or all of these results may be readily ascertained.

The invention may of course be used for calculations of this character in all computations where such calculations are required, but it will be found especially useful for photo-engravers or photo-lithographers in quickly determining the proportion of reduction to be made in the photograph of an original copy when the size of the photograph is given; or determining the size of the photograph to be made when the proportion of reduction is previously known. It is of course understood in the art of photo-lithography that a camera, while adjusted to photograph an original down to a certain proportion of reduction, cannot be used while thus adjusted for photographing any other article down to a different proportion of reduction. It is frequently the case, however, that the photographer will have a great variety of copies or articles to be photographed, and these will vary in size and consequently cannot all be photographed upon the same plate, or with the camera set at the same focus and adjustment, unless it be previously ascertained that they are all to be reduced in the same proportion. For example, it might be required to reduce a copy three feet long to a photograph one foot long, which would be two-thirds reduction, and it may also be required to reduce a copy three inches long to a one-third reduction. If these two copies are placed before the camera at one time, it is obvious that when the camera is positioned to reduce the larger one two feet, the smaller one would be reduced to one inch instead of two inches. Consequently, these two articles must be photographed at different times, and the camera must be adjusted for each separately. If it be ascertained in advance, however, that both articles are to be reduced two-thirds, or the same proportion of reduction, they may be photographed at the same time and upon the same plate without regard to the great disparity in their original sizes, and this would be true with any number of original copies, there being no limit to the number that might be photographed at one time within the capacity of the negative plate. In this art, however, the customer does not always give the proportion of reduction, but more often simply requires a copy of a given size to be reduced to a certain size stated in inches, or other measurement, and consequently, where the photographer has a great variety of copies varying in size to be reduced to a great variety of other sizes, it becomes necessary for him to calculate on each one the exact proportion of reduction which each is to undergo in order to ascertain the exact reduced size required by the customer, or else it would be necessary to photograph each article separately and adjust the camera until the image therein is brought down to the required size and is sharply focused on the camera screen. Needless to say, such a method is not only troublesome and tedious, but consumes valuable time and entails a great waste of space on plates that are ordinarily large enough for more than one photograph, to say nothing of the extra expenditure of light and chemicals in the development of these plates. With a chart such as that embodying this invention, however, the exact proportion of reduction of all of these various copies may be readily ascertained and the proportion marked thereon, and all those of the same proportion may be grouped together to be photographed at a single exposure or by a single adjustment of the camera and its lens; or, by providing the camera index slide with a scale of figures or characters corresponding to a similar scale of figures or characters on the chart constituting this invention, the user of the chart may accomplish the same object by merely making these numbers or characters on the backs of the copies to indicate to the photographer that all copies of a given number or character may be photographed at a single exposure, or with the camera at the same adjustment.

With a view to the attainment of these ends and the accomplishment of certain other objects which will hereinafter appear, the invention consists in the features of novelty which will now be described with reference to the accompanying drawing, and then more particularly pointed out in the claims.

The said drawing is a face view of a proportional divider in the form of a chart embodying this invention.

Upon a sheet of cardboard, paper, or other suitable surface is printed or indicated points extending between the lines A—D, indicating linear measurement, and may be suitably divided into units of measurement, and fractions of such units.

In the exemplification shown in the drawing, the units of measurement indicated in this scale A—D, are inches, and it will be seen that it is divided into eight equal parts along the line A—D, by the numerals 1 to 8. Extending at an angle to the line A—D is a line A—B, and on one side of this line A—B is another scale divided into units of linear measurement and fractions of such units. The two scales A—B and A—D start from a common point and they are correspondingly divided and sub-divided. That is to say, the scale A—D being divided into inches, the other scale A—B is also divided into inches, and the fractional divisions of one of these scales are equal to the fractional divisions of the other of these scales. The highest number of the scale A—B, however, is situated contiguous the lowest number of the scale A—D. In this exemplification of the invention, the two scales A—B and A—D are arranged at right angles to each other in such a way that if they were of the same length and their outer ends were connected together, they would constitute a triangle, but in order to save width, it will be seen that the length constituting the difference between the length of the line A—B and the length of the line A—D is added to the scale A—D by a vertical line C—D. The height of the line C—D is such that if the lines A—B and A—D were of equal length and connected together by a continuation of the line B—C, the line C—D would intersect the line B—C.

From the divisions or graduations of the scale A—B are extended parallel horizontal lines which preferably continue entirely across the chart, and from the graduations and numerals of the scale A—D are continued parallel perpendicular lines which cross the said parallel lines extending from the graduations of the scale A—B and form perfect squares therewith. In thus dividing the chart into squares, it is preferable to indicate the graduations of the whole numbers by heavy lines, and those of the fractional divisions by light lines. In this example of the invention, the fractional divisions are quarter inches, and for the purpose which will be presently described, the fractional divisions of the scale A—B are numbered consecutively, and consequently, in a twelve inch scale, these numbers will range from 1 to 48. These numbers indicating the fractions of scale A—B, however, are arranged in the reverse order to those indicating the whole inches.

In addition to the lines dividing the chart into squares, it is also provided with radial lines which extend from the apex of the lines A—B and B—C to the graduations or divisions and sub-divisions of the scale A—D—C.

The scale A—D—C is for indicating the size for reduction or enlargement and also the size of the copy. Thus, for example, if it should be desired to reduce a copy from 4½ inches x 7¾ inches to 5½ inches, the diagonal line extending from the point or graduation on the scale A—D indicating the length of the copy, or 7¾ inches, will be followed to the point where it intersects the perpendicular line extending from the point on the scale A—D, which indicates the length of the reduced size, which is 5½ inches, and from this point, that is, the point of intersection of the said two lines, the nearest horizontal line is followed to the left, and the number in the scale A—B is indicated. In this example of the invention, the number in the scale A—B thus indicated is 14. Now, it is obvious that if the camera slide be provided with an index corresponding to the photographer's focusing index indicated on the chart along the line A—B by the numbers 1 to 48, the photographer will be able to instantly determine that the camera must be moved along the slide until its pointer registers with the number 14, when it will be in exact position for photographing a copy 7¾ inches long down to a reduced size of 5½ inches long. It is unnecessary that the photographer know just what proportion of reduction this would amount to, but if desired the proportion of reduction may be indicated on the left of the line A—B contiguous to the number 14. In the example given this would be about 3/10ths reduction. In this exemplification of the invention, these proportions of reduction are not indicated at the end of each of the horizontal lines because it is unnecessary in practice, but the proportions of reduction which are usually required are indicated in a separate scale at the left of the line A—B and at the point in the length thereof where they would fall if horizontal lines were drawn from the diagonal lines to the line A—B at the point where the diagonal lines indicating the length of the copy intersect the vertical lines indicating the length of the reduced sizes. It will be seen that these fractions do not always fall at the particular horizontal lines indicating quarter inches, but they are near enough for practical purposes, and it is not desirable to provide the chart with the additional horizontal lines extending from the fractions indicating the proportion of reduction, as such a multiplicity of lines would be confusing.

Should it be desired to ascertain the exact width of the reduction, the diagonal line on the scale A—D is followed until it intersects a horizontal line extending from the proportion of reduction which in this example would be 3/10ths. There being no horizontal line indicated at this point, it must be imagined or indicated by a straight edge. The point or graduation on the scale A—D directly below the point where this imaginary line touches the diagonal line will be the width of the reduction, which in this example is about 3 3/16ths inches.

For convenience in the use of the chart, and as a guide to the eye, a string E may be suspended from the apex of the lines A—B and B—C, which will guide the eye along the diagonal lines, and may also serve for indicating intermediate positions between these lines.

Should it be desired to use the chart for calculating enlargements, the same may be provided on the right hand side with a series of numerals starting at the mid-length of that side of the triangle and continuing to the lower right hand corner from 1 to 24, the horizontal lines spaced one-fourth inch apart being thus numbered consecutively, and opposite or adjacent each of these consecutive numbers is placed a fraction indicating the extent of enlargement. The middle one of the horizontal lines, i.e., the one extending from the numeral 6, is made heavier than the other horizontal lines, so as to readily distinguish that one from the others, and the divisions thereof produced by the heavy vertical lines are numbered from left to right consecutively from 1 to 6. This heavy horizontal line is to be utilized for measuring the copy to be enlarged.

In using the chart for enlarging a copy from a 4¾ inch size to 6½ inch size, for example, the indicating string is placed upon the point representing 4¾ inches on the heavy horizontal line, and is then followed downward to the point where it crosses the vertical line indicating the size of the enlargement, or 6½ inches. The horizontal line nearest this point of intersection when followed towards the right, will give the proportion of enlargement. In this example, such horizontal line leads to the fraction 3/8ths, which is the proportion of enlargement of a copy 4¾ to 6½.

Now, it is quite evident that by providing the camera slide with a set of numerals corresponding to the numerals extending from the heavy horizontal line downwardly on the right of the chart, that is, the numerals from 1 to 24, it may be told at a glance just where the camera slide should be adjusted in order to effect this enlargement. In the particular example given, it will be seen that the horizontal line adjacent the fraction 3/8ths leads to the numeral 9, and consequently the photographer understands that his camera must be adjusted on the slide to the numeral 9, which will produce a photograph 3/8ths larger than a copy originally measuring 4¾. It is of course understood that the numerals on a camera stand or slide corresponding to the numerals 1 to 24 must be accurately placed, but when once the camera has been adjusted for these various positions and the positions marked, it suffices for all time so long as the same lens is employed.

In order that the invention may be understood by those skilled in the art, the details of an exemplification thereof have been thus specifically described, but

What I claim is—

In a device for the purpose described, the combination of a scale divided into fractions of a unit of measurement, lines extending from said divisions, a second scale converging with said first scale and being similarly divided, lines extending from the divisions of the second scale and crossing the lines of the first scale and forming squares therewith, means for indicating a straight line between a common point at the outer end of the first said scale to any one of the divisions of the second said scale, and a scale indicating proportions of reduction arranged contiguous to said first scale and containing fractional notations, each of said fractional notations being located in the third said scale at a point in the length of the first said scale where the first said scale would be cut by a right line which would intersect a line drawn from said common point of radiation to the point on the second said scale indicating the size to be reduced, and a third line intersecting the last said line and the second said scale at the point on the second said scale indicating the size of the reduction.

In testimony whereof I have signed my name to this specification, in the presence of two subscribing witnesses, on this 20th day of February A. D. 1908.

GEO. H. BENEDICT.

Witnesses:
W. H. DE BUSK,
FRANCIS A. HOPKINS.